(12) United States Patent
Polyakov et al.

(10) Patent No.: US 7,647,636 B2
(45) Date of Patent: Jan. 12, 2010

(54) GENERIC ROOTKIT DETECTOR

(75) Inventors: Alexey A. Polyakov, Sammamish, WA (US); Neil A. Cowie, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 895 days.

(21) Appl. No.: 11/210,565

(22) Filed: Aug. 24, 2005

(65) Prior Publication Data

US 2007/0055711 A1 Mar. 8, 2007

(51) Int. Cl.
*G06F 11/00* (2006.01)
(52) U.S. Cl. ............... 726/24; 726/22; 726/23; 726/25; 726/26; 717/124; 717/126; 713/187; 713/188; 707/1; 707/203
(58) Field of Classification Search ............... 726/22, 726/24, 26, 27, 1; 707/1, 203; 717/124, 717/126; 713/187, 188; 714/38
See application file for complete search history.

(56) References Cited

U.S. PATENT DOCUMENTS

| | | | | |
|---|---|---|---|---|
| 6,663,000 B1 * | 12/2003 | Muttik et al. | ............... | 235/375 |
| 7,228,434 B2 * | 6/2007 | Zisowski | .................... | 713/187 |
| 7,257,842 B2 * | 8/2007 | Barton et al. | .................. | 726/24 |
| 7,346,781 B2 * | 3/2008 | Cowie et al. | ................. | 713/189 |
| 7,376,970 B2 * | 5/2008 | Marinescu | .................... | 726/22 |
| 7,392,544 B1 * | 6/2008 | Pavlyushchik | ................ | 726/24 |
| 2004/0199827 A1 * | 10/2004 | Muttik et al. | .................. | 714/38 |
| 2006/0031673 A1 * | 2/2006 | Beck et al. | .................... | 713/164 |
| 2006/0294592 A1 * | 12/2006 | Polyakov et al. | .............. | 726/24 |

OTHER PUBLICATIONS

Jan K Rutkowski, Advanced Windows 2000 Rootkit Detection (Execution Path Analysis), pp. 1-12, Jul. 2003.*

* cited by examiner

*Primary Examiner*—Nasser G Moazzami
*Assistant Examiner*—Shanto M Abedin
(74) *Attorney, Agent, or Firm*—Workman Nydegger

(57) ABSTRACT

A generic RootKit detector is disclosed that identifies when a malware, commonly known as RootKit, is resident on a computer. In one embodiment, the generic RootKit detector performs a method that compares the properties of different versions of a library used by the operating system to provide services to an application program. In this regard, when a library is loaded into memory, an aspect of the generic RootKit detector compares two versions of the library; a potentially infected version in memory and a second version stored in a protected state on a storage device. If certain properties of the first version of the library are different from the second version, a determination is made that a RootKit is infection the computer.

21 Claims, 7 Drawing Sheets

GENERIC ROOTKIT DETECTOR

BACKGROUND

As more and more computers and other computing devices are interconnected through various networks such as the Internet, computer security has become increasingly more important, particularly from invasions or attacks delivered over a network or over an information stream. As those skilled in the art and others will recognize, these attacks come in many different forms, including, but certainly not limited to, computer viruses, computer worms, system component replacements, Trojans, RootKits, spyware, denial of service attacks, even misuse/abuse of legitimate computer system features, all of which exploit one or more computer system vulnerabilities for illegitimate purposes. While those skilled in the art will recognize that the various computer attacks are technically distinct from one another, for purposes of the present invention and for simplicity in description, all malicious computer programs that spread on computer networks such as the Internet, will be generally referred to hereinafter as computer malware or, more simply, malware.

When a computer system is attacked or "infected" by computer malware, the adverse results are varied, including disabling system devices; erasing or corrupting firmware, applications, or data files; transmitting potentially sensitive data to another location on the network; shutting down the computer system; or causing the computer system to crash. Yet another pernicious aspect of many, though not all, computer malware is that an infected computer system is used to infect other computer systems that are communicatively connected by a network connection.

A traditional defense against computer malware and, particularly, against computer viruses and worms, is antivirus software that is available from numerous software vendors. Most antivirus software identifies malware by matching patterns within data to what is referred to as a "signature" of the malware. Typically, antivirus software scans for malware signatures when certain events are scheduled to occur, such as when data is going to be written or read from a storage device on the computer. As known to those skilled in the art and others, computer users have ongoing needs to read and write data to storage devices such as a hard drive. For example, a common operation provided by some software applications is to open a file stored on a hard drive and display the contents of the file on a computer display. However, since opening a file may cause malware associated with the file to be executed, antivirus software typically performs a scan or other analysis of the file before the open operation is satisfied. If malware is detected, the antivirus software that performed the scan may prevent the malware from being executed, for example, by causing the open operation to fail.

Increasingly, malware is being distributed with one or more programs specifically designed to conceal malware from software designed to protect a computer (e.g., antivirus software, anti-spyware software, and the like). Similar to other types of applications installed on a computer, software designed to protect a computer from malware relies on services provided by an operating system to search a computer for data and/or behaviors that are characteristic of malware. However, if a malware is able to infect components of a computer operating system, the malware may control the information that is provided to software designed to protect a computer. Malware that is designed to conceal itself or other malware on a computer will be generally referred to hereinafter as a "RootKit."

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The foregoing problems discussed in the Background Section above are overcome by a generic RootKit detector, embodiments of which are directed at identifying when a malware, commonly known as RootKit, is resident on a computer. More specifically, in one embodiment, the generic RootKit detector performs a method that compares the properties of different versions of a library that implements functionality of an operating system to provide services to an application program. In this regard, when a library is loaded into memory in preparation of program execution, an aspect of the generic RootKit detector compares two versions of the library, a potentially infected version that was loaded in memory and a second version stored on a storage device in a protected state. If certain properties of the first version of the library are different from the second version, a determination is made that a RootKit is modifying the library after the library is loaded in memory.

In another embodiment, the generic RootKit detector acts as a software system that searches a computer for a RootKit. More specifically, the software system includes (1) an operating system that provides services to an application program; (2) an integrity module that compares a potentially infected version of the library that is loaded in memory with a "known good" version of the library that is maintained in a protected state on a storage device; (3) a scan engine configured to detect signatures that are associated with malware; and (4) a handling routine operative to trace the path of program execution to a set of instructions so that the scan engine may search the instructions for a malware signature.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
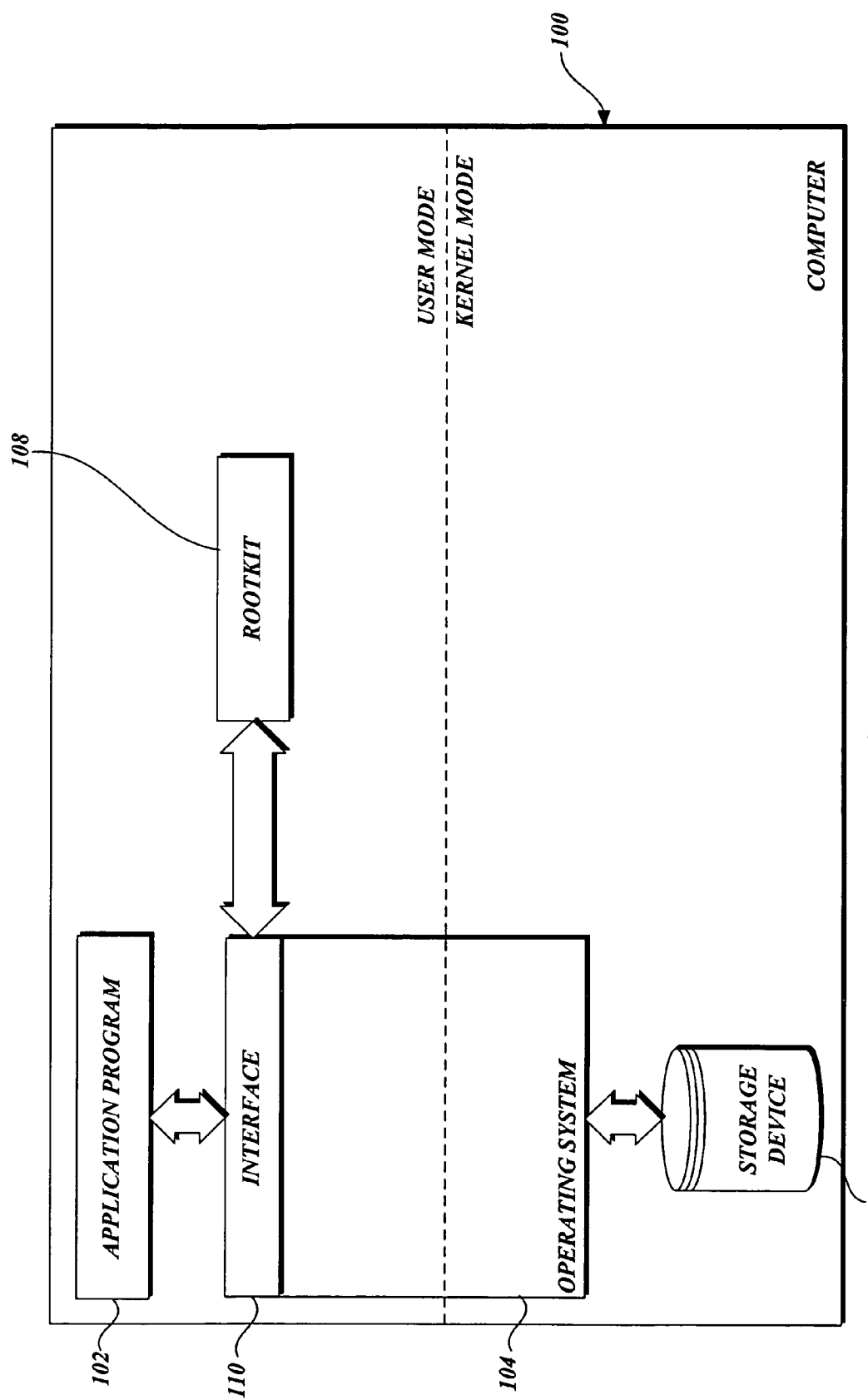
FIG. 1 is a block diagram of a computer with various software components and a RootKit that is designed to conceal malware that is resident on the computer.

For illustrative purposes and by way of example only, FIG. 1 depicts how a RootKit is able to control the information that is made available to software designed to protect a computer 100 from malware. As illustrated in FIG. 1, the computer 100 includes an application program 102, an operating system 104, a storage device 106, and a RootKit 108. Also, the operating system 104 includes an interface 110 that provides services in the form of an Application Programming Interface ("API") to one or more application program(s) installed on the computer 100. APIs form a layer of software that defines a set of services offered by an operating system to an application program. An application program written for Win 32 APIs, for example, will run on all Win 32 operating systems. These systems are often targets of malware designers because their popularity offers a better opportunity for widespread dissemination of malware. In this example, the application program 102 performs actions designed to protect the computer 100 from malware, such as scanning one or more files for malware "on access" when a user attempts to access a file stored on the storage device 106. However, as illustrated in FIG. 1, the application program 102 performs operations in user mode and relies on services provided by the operating system 104 that operates, at least partially, in kernel mode. Moreover, the computer 100 is infected with the RootKit 108 that "hooks" into the operating system 104 where it intercepts API calls made by the application program 102. Stated differently, the RootKit 108 acts as a "man-in-the-middle," monitoring and altering communications between the operating system 104 and application programs installed on the computer 100. If an application program, such as an antivirus or anti-spyware software program attempts to list the contents of a directory containing one or more files used by a malware, the RootKit 108 will censor the file name from the list. Similarly, the RootKit 108 may hide entries in the system registry, process lists and the like, thereby controlling access to all of the information that the RootKit 108 wants hidden.

Typically, a RootKit adds an object to an Auto Start Extensibility Point (hereinafter "ASEP") on a computer so that API calls may be monitored and the results modified. Generally described, ASEPs refer to extensibility points that allow application programs to begin operating without explicit user invocation. When an object is added to an ASEP, the RootKit either automatically begins execution with a utility provided by a computer operating system or uses a program that is commonly executed by users (e.g., an Internet Web browser program). ASEPs can be viewed in two ways: (1) as "hooks" (i.e., extensions) to existing auto-start application programs, or (2) as standalone software applications that are registered as operating system auto-start extensions, such as an NT service in the MICROSOFT WINDOWS® operating system or as a daemon in UNIX-based operating system. Moreover, those skilled in the art and others will recognize that the RootKit 108 may operate either in user mode or kernel mode.

Figure 2A:
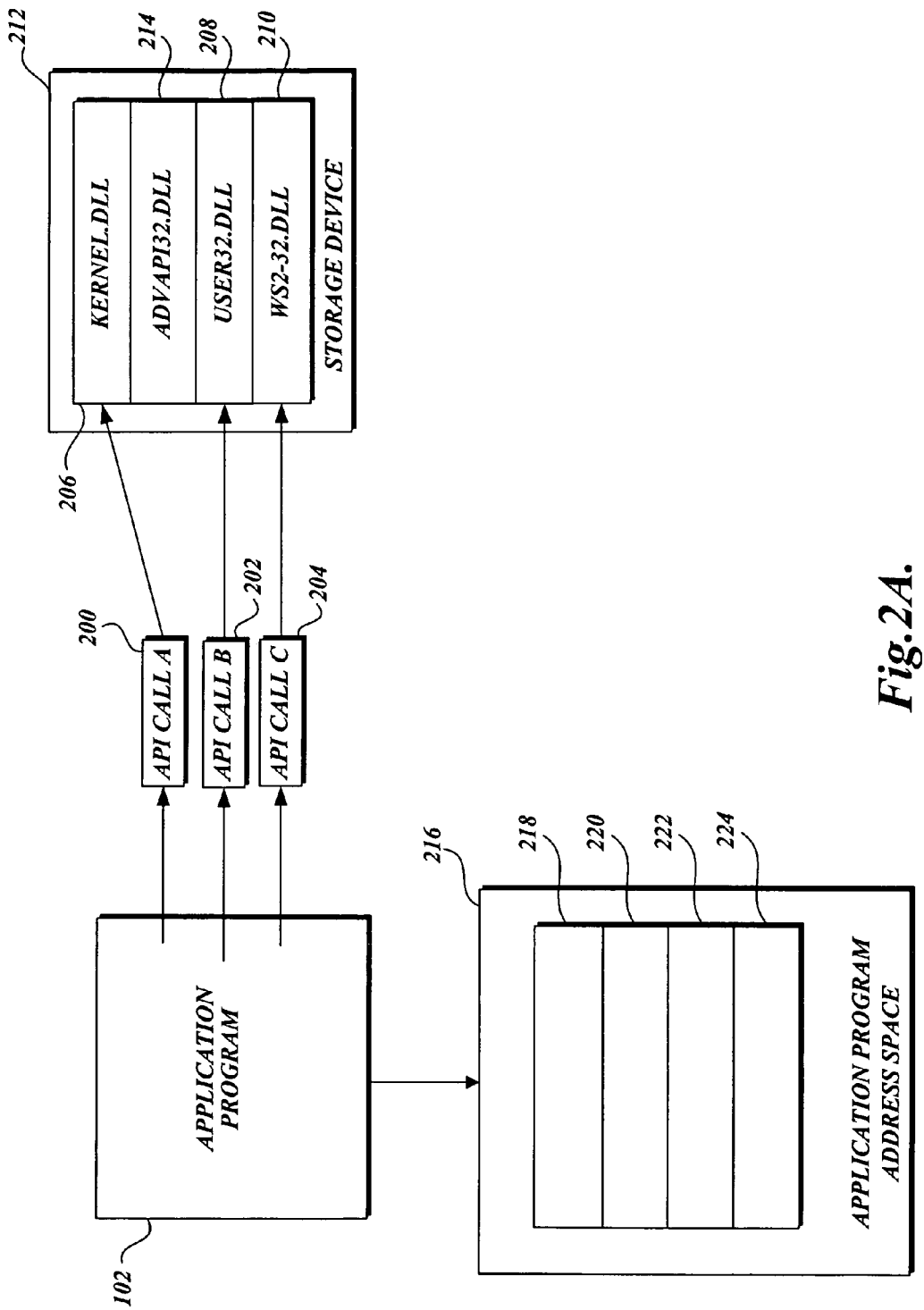
FIG. 2A is a block diagram illustrating the process of loading Dynamically Linked Libraries into the memory address space allocated to an application program.
Figure 2B:
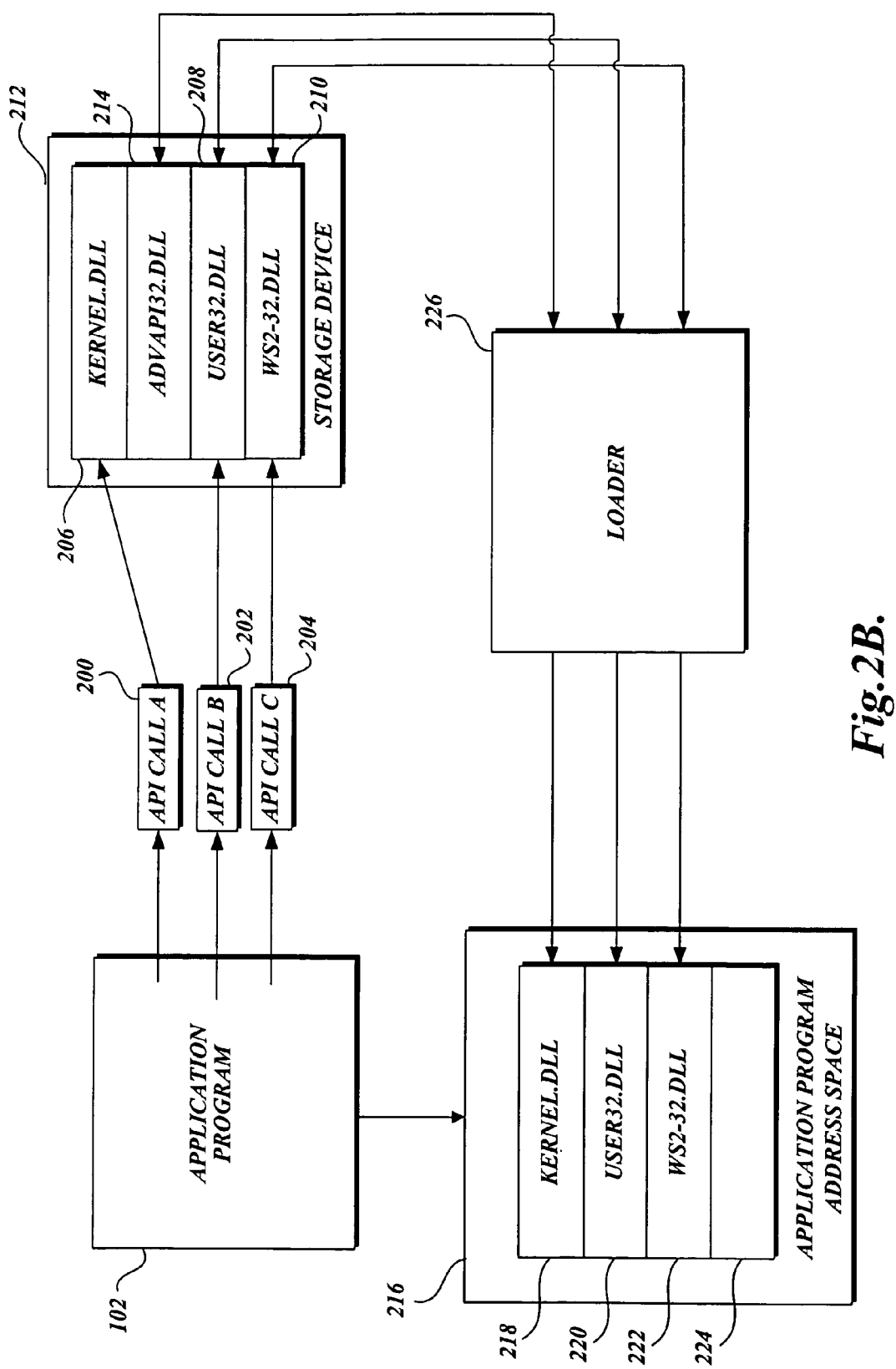
FIG. 2B is a block diagram illustrating the process of loading Dynamically Linked Libraries into the memory address space allocated to an application program.

FIGS. 2A and 2B illustrate the process of loading Dynamically Linked Libraries (hereinafter "DLLs") when an application program issues an API call that is satisfied with routines maintained in a DLL. Typically, application programs are constructed by combining segments of program code obtained from different sources. The segments may be combined before compiling and then compiled into an application program. Alternatively, when a segment of source code is frequently used, it is often preferable to compile the segment separately and produce a routine and to combine the routine with other routines into a library. A DLL is one type of library that may be dynamically linked to an application program at runtime.

In some operating systems, such as the Win 32 operating system, compiled code that satisfies API calls is linked to a calling application program in a DLL. If an API call is made, the corresponding DLL is loaded from a storage device (i.e., a hard drive) into either a memory address space used solely by the calling application program or a shared memory address space. The memory address space available to an application program is the actual memory store used to access necessary routines and data when an application program is running. Typically, the memory address space is mapped to a volatile memory location (i.e., RAM) that is initialized just prior to program execution. Those skilled in the art and others will recognize that a component of an operating system, typically referred to as loader, copies required data from a storage device into the initialized memory address space.

As illustrated in FIG. 2A, application program 102 contains three API calls: API CALL A 200, API CALL B 202, and API CALL C 204. API CALL A 200 requires application program code in a DLL identified as KERNEL.DLL 206 that must be linked to application program 102 for API CALL A 200 to be satisfied. Similarly, API CALLB 202 and API CALLC 204 reference routine in USER32.DLL 208 and WS2-32.DLL 210, respectively. Thus, both USER32.DLL 208 and WS2-32.DLL 210 must be linked to application program 102 for API CALL B 202 and API CALL C 204 to be satisfied. KERNEL.DLL 206, USER32.DLL 208, and WS2-32.DLL 210 are stored on a storage device 212 along with other DLLs, such as ADVAPI32.DLL 214, which does not satisfy any API calls in this example. When application program 102 is selected for execution, an operating system initializes an application program's address space 216 and assigns the address space a series of memory locations, four of which (218, 220, 222, and 224) are shown in FIG. 2A.

FIG. 2B illustrates the process in the operating systems of loading DLLs into an application program's address space 216. As described with reference to FIG. 2A, API CALL A 200, API CALL B 202, and API CALL C 204 require KERNEL.DLL 206, USER32.DLL 208, and WS2-32.DLL 210 to be loaded into memory in order to be satisfied. Prior to execution, a loader 226 copies the KERNEL.DLL 206, USER32.DLL 208, and WS2-32.DLL 210 from the storage device 212 to the three memory locations 218, 220, and 222 in the application program's address space 216. This transfer allows the KERNEL.DLL 206, USER32.DLL 208, and WS2-32.DLL 210 to be linked to the application program 102. In this way, API CALL A 200, API CALL B 202, and API CALL C 204 are capable of being satisfied.

Figure 3:
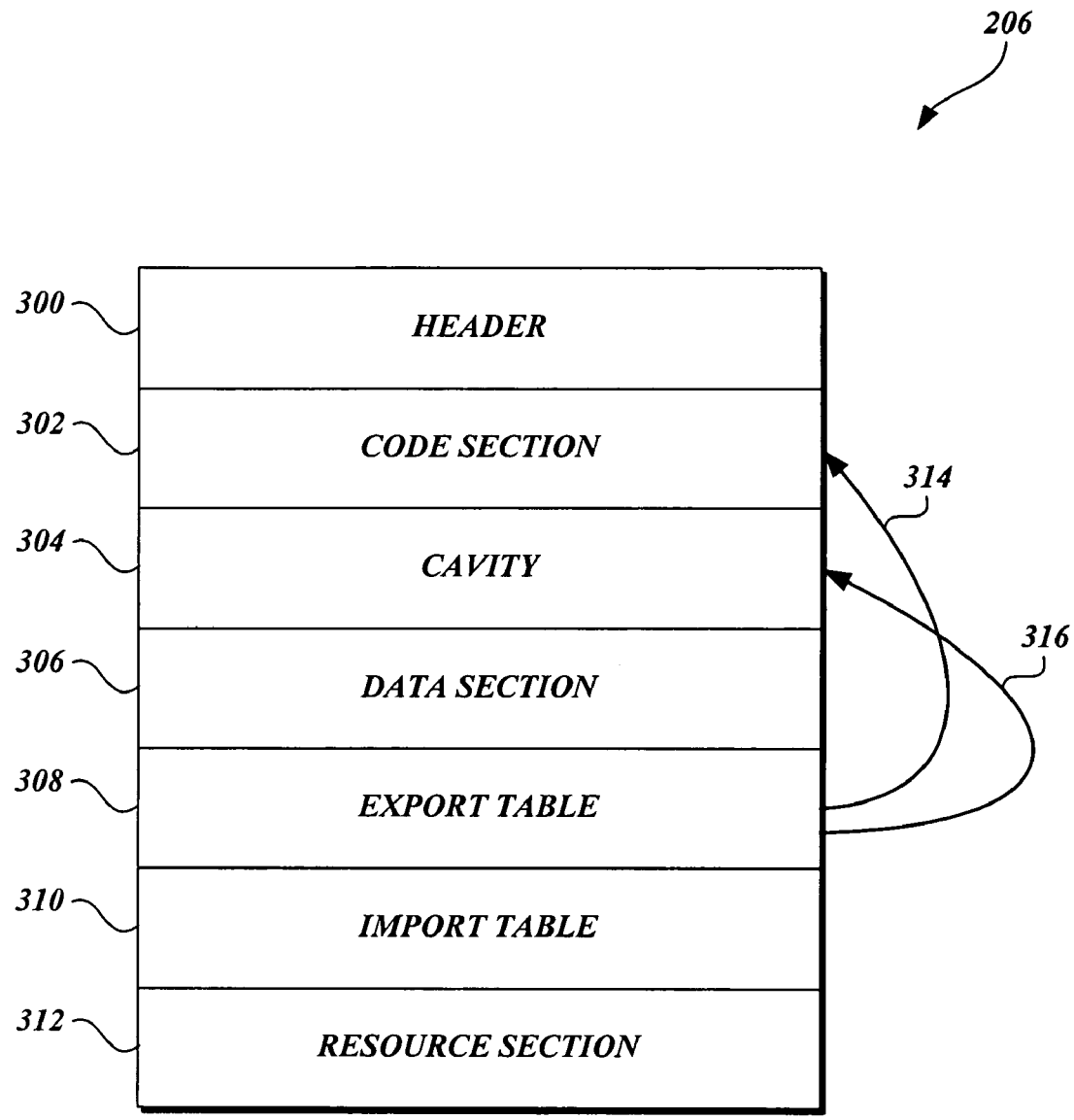
FIG. 3 is a pictorial depiction that illustrates components of a Dynamically Linked Library that may be referenced to satisfy an Application Programming Interface call.

Now with reference to FIG. 3, components of the KERNEL.DLL 206 depicted in FIGS. 2A-B will be described for the purpose of illustrating how a RootKit may "hook" API calls that are satisfied by the KERNEL.DLL 206. As illustrated in FIG. 3, the KERNEL.DLL 206 consists of a header 300, code section 302, cavity 304, data section 306, export table 308, import table 310, and resource section 312. Those skilled in the art and others will recognize that the elements that make up the KERNEL.DLL 206 are typical for a library that contains routines designed to satisfy API calls. However, since a number of the elements included in the KERNEL.DLL 206 that are illustrated in FIG. 3 are not necessary for an understanding of how a RootKit "hooks" API calls, a description of these elements will not be provided here.

In one type of RootKit, program code is injected into the export table of a DLL in order to redirect the flow of program execution to instructions associated with a RootKit. As described above with reference to FIGS. 2A-2B, when a program is scheduled to be executed, a component of an operating system, commonly referred to as a loader, copies one or more DLLs that are needed by an application program into the memory address space assigned to the application program. Then information about called APIs or other functions that are scheduled to be executed is extracted from one or more DLLs. More specifically, the loader obtains data that is needed to calculate call addresses of routines that satisfy API calls made by the application program using data that is maintained in the export table 308 of a DLL.

FIG. 3 illustrates a common way that a RootKit is able to cause the flow of program execution to "jump" to instructions associated with a RootKit. In this example, a RootKit overwrites an offset value in the export table 308, which is read by a loader for the purpose of identifying the call address of the routine that handles an API call. Normally, during program execution, when an API call is made, data extracted from the export table 308 is used to identify the memory location that contains the routine for handling the API call. Those skilled in the art and others will recognize that routines that handle API calls are maintained in the code section 302 of a DLL. In the context of FIG. 3, when a computer is not infected with RootKit, data in the export table 308 contains an offset value that serves as a pointer 314, which refers to a routine in the code section 302 that handles the API call. However, one type of RootKit overwrites the offset value with a new pointer 316 that causes program execution to "jump" to instructions implemented by a RootKit. In this example, the RootKit instructions are located in the cavity section 304 of the KERNEL.DLL 206. Those skilled in the art will recognize that a modification made to one or more libraries typically occurs to a library while loaded in memory rather than the version of the library that is persisted on a storage device. RootKit authors cause changes to be made to the library loaded in memory to "work around" file protections and other mechanisms that limit access to libraries stored on a storage device. Moreover, those skilled in the art and others will recognize that a RootKit may function in different ways than described with reference to FIG. 3. For example, some RootKits allow program execution to jump to the code section 302, where instructions injected by the RootKit redirects program execution to another memory location, such as a memory location that is outside of the memory image of the KERNEL.DLL 206. As described in further detail below, aspects of the generic RootKit detector described herein are able to detect any of these types of RootKits that overwrites data that is maintained in a library.

Now with reference to FIG. 4, an exemplary computer architecture for a computer 400 that may be used to implement one or more embodiments of the generic RootKit detector will be described. Of course, those skilled in the art will appreciate that the computer 400 may include greater or fewer components than those shown in FIG. 4. Moreover, while the generic RootKit detector will be described primarily in the context of identifying a malware commonly known as a "RootKit," those skilled in the art and others with recognize that the concepts described herein are applicable in other contexts.

Now with reference to FIG. 4, components of a computer 400 that are capable of implementing aspects of the generic RootKit detector -will be described. For ease of illustration and because it is not important for an understanding of the claimed subject matter, FIG. 2 does not show the typical components of many computers, such as a CPU, keyboard, a mouse, a printer, or other I/O devices, a display, etc. However, as illustrated in FIG. 4, the computer 400 does maintain many of the same components of like-name described above with reference to FIG. 1. In this regard, the computer 400 includes an application program 402, an operating system 404, and a storage device 406. Also, the operating system 404 includes an interface 408 and a software monitoring system 410 that maintains an integrity module 412, a handling routine 414, and a scan engine 416. Collectively, the components maintained in the software monitoring system 410 provide a generalized way of identifying a RootKit that is resident on the computer 400, regardless of whether the RootKit operates in kernel mode or user mode. In this regard, any of the components in the software monitoring system 410 may be implemented in a kernel mode device such as a driver. Moreover, the components may also be implemented in a user-mode system such as an application program.

Figure 4:
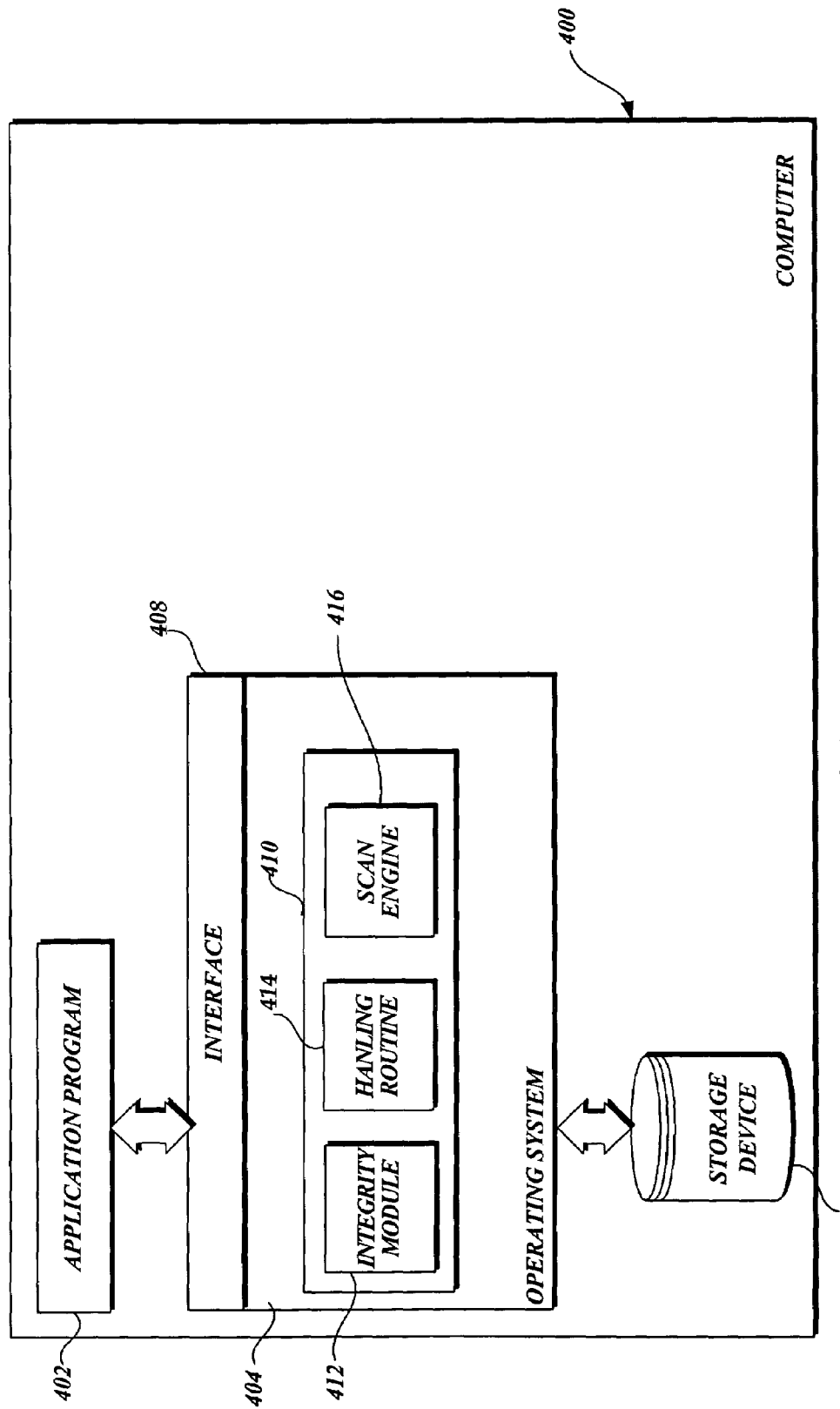
FIG. 4 is a block diagram of a computer with software components that are configured to implement aspects of the generic RootKit detector.

The operating system 404 illustrated in FIG. 4 may be any general-purpose operating system such as a Microsoft® operating system, UNIX® operating system, or Linux® operating system. As known to those skilled in the art and others, the operating system 404 controls the general operation of the computer 400 and is responsible for management of hardware and basic system operations as well as executing application programs. Moreover, the operating system 404 provides services to application programs that are designed to protect a computer from malware. For example, the operating system 400 may provide services to the application program 402 for (1) identifying programs that are currently executing (sometimes referred to as "process enumeration"); (2) identifying files that are resident on the computer; or (3) describing input/output ("I/O") being generated from the file system or important databases such as the system registry, and the like. As mentioned previously, a RootKit may infect the operating system 404 and modify communications made between the operating system 404 and the application program 402 for the purpose of concealing malware that is resident on the computer.

In the embodiment illustrated in FIG. 4, components that implement the generic RootKit detector (e.g., the integrity module 412, the handling routine 414, and the scan engine 416) are implemented in the software monitoring system 410, which searches computer memory for malware. However, the components that implement the generic RootKit detector may be implemented in any number of software systems or utilities such as antivirus software, anti-spyware software, and the like, all of which monitor data that is loaded in memory for the purpose of detecting malware.

As illustrated in FIG. 4, the software monitoring system 410 includes a scan engine 416 that is designed to detect specific patterns associated with malware which may include but are not limited to text, strings, binary sequences or other program code and/or binary data input or generated by a computer. Many different software vendors include a scan engine or equivalent mechanism in antivirus software that is designed to identify a pattern of data that is characteristic of malware. One known technique employed by some existing scan engines for identifying malware includes obtaining a copy of the malware "in the wild." Program code that implements the malware is processed with a hash function that converts the program code into a "signature" that may be used to uniquely identify the malware. Then the scan engine searches a specific set of data for a signature that is associated with a known malware. As described in further detail below, the scan engine 406 illustrated in FIG. 4 may employ a signature based approach to search a specific set of data for malware. However, the scan engine 406 may also be configured to perform additional or different types of analysis in order to search for malware.

As illustrated in FIG. 4, the software monitoring system 410 includes an integrity module 412. Since functions and different embodiments of the integrity module 412 are described below with reference to FIG. 5, a detailed description of the integrity module 412 will not be provided here. However, generally described, the integrity module 412 compares properties of two versions of a library that provides services on behalf of an operating system to an application program. In this regard, after an operating system loads a library, such as a DLL, into memory in preparation of program execution, the integrity module 412 reads data from a version of the library stored on a storage device. Then the integrity module 412 compares certain properties of the version of the library loaded in memory with the version maintained on the storage device for the purpose of determining whether a RootKit is modifying data in the version of the library that is loaded in memory.

As illustrated in FIG. 4, the software monitoring system 410 includes a handling routine 414 that implements stealth defeating techniques for preventing a RootKit from altering the flow of program execution. Since functions and different embodiments of the handling routine 414 are described below with reference to FIG. 6, a detailed description of the handling routine 414 will not be provided here. However, generally described, the handling routine 414 is configured to work in conjunction with the integrity module 412 that was briefly described above. When the integrity module 412 determines that a library, such as a DLL, is infected or otherwise being improperly modified by a RootKit, the handling routine 414 traces the path of program execution to a set of "meaningful" instructions associated with the RootKit. Then a signature-based scan of the meaningful instructions is performed for the purpose of identifying the specific RootKit that is concealing malware on the computer 400. If the specific RootKit is identified, the handling routine 414 may use data obtained from one or more libraries that was stored in a protected state to bypass instructions associated with the RootKit.

As known to those skilled in the art and others, FIG. 4 is a simplified example of a computer 400 capable of performing the functions of the generic RootKit detector. Actual embodiments of the computer 400 will have additional components not illustrated in FIG. 4 or described in the accompanying text. Also, FIG. 4 shows one component architecture that may be used to implement the generic RootKit detector. Thus, the software components illustrated in FIG. 4 should be construed as exemplary and not limiting.

Now with reference to FIG. 5, an exemplary embodiment of an integrity module 412 that determines whether a RootKit is infecting a computer will be described.

At decision block 500, the integrity module 412 remains idle and waits until a scanning event is identified. Those skilled in the art and others will appreciate that anti-malware systems may search or initiate a scan for malware in many different circumstances. For example, systems in which the generic RootKit detector may be integrated with, such as antivirus software, anti-spyware software, and the like, will typically perform a scan for malware "on access" when a user or software system selects an application program for execution. Since executing an application program may expose a computer to malware, data associated with an application program is scanned before execution is initiated. Moreover, a system in which the generic RootKit detector may be integrated with can be configured to perform a scan "on demand" when a user or software system generates a command that causes a volume or other logical partition of data to be scanned. However, generally described, the integrity module 412 may be configured to perform a scan whenever a call is made to the integrity module 412. For example, some existing systems use heuristics to "pre-fetch" data into system memory in anticipation that a user will cause an application program to be executed. Data required to execute the application program may be scanned for malware when loaded into system memory before the user issues the command to execute the program. In one embodiment, data loaded into system memory is scanned for a RootKit "in the background" without requiring input from the user. Moreover, the generic RootKit detector may cause a scan for a RootKit to be performed when computer resources (e.g., the CPU) on the computer are idle thereby minimizing the impact of the scan on the user.

At block 502, an operating system causes a library (e.g., the DLL 206) to be loaded into the memory address space available to the application program. In modern computers, satisfying the needs of application programs for fast access to data is handled by an operating system. More specifically, as described above with reference to FIGS. 2A-2B, a component of an operating system, known as a loader, copies or loads necessary libraries from a hardware device that serves as permanent store for the libraries into a memory address space that is available to an application program. For example, when an application program makes an API call that requests services of an operating system, the library that contains the routine that handles the API call is loaded into memory. However, since FIGS. 2A-2B describe the process of loading one or more libraries into an address space that is available to an application program, further description of this process will not be provided here. Moreover, the integrity module 412 is described in the context of loading a single library into memory. However, those skilled in the art and others will recognize that multiple libraries will typically be loaded into memory when a scanning event occurs. Moreover, those skilled in the art will recognize that the actions performed by the integrity module 412 may be repetitively applied to multiple libraries.

Figure 5:
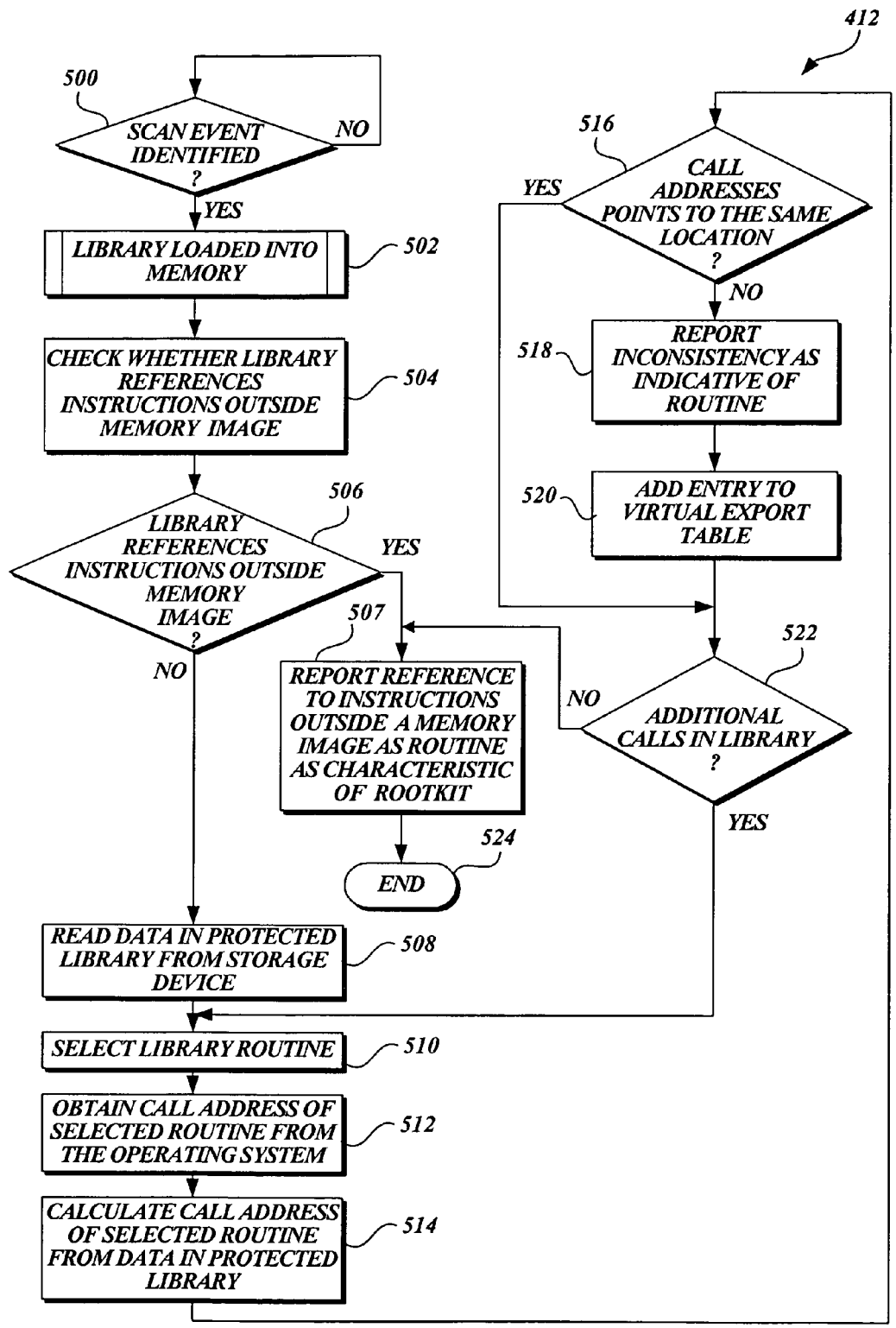
FIG. 5 is an exemplary flow diagram that depicts an integrity module which may be used to implement aspects of the generic RootKit detector in determining whether a computer is infected with a RootKit.

As illustrated in FIG. 5 at block 504, the integrity module 412 performs an analysis to determine whether the library loaded into memory at block 502 references instructions that are outside the library's "memory image." A RootKit may overwrite data in a library for the purpose of routing the flow of program execution to instructions associated with a RootKit. In some instances, a RootKit routes the flow of program execution to instructions that are outside of the "memory image" of the library. In any event, when a RootKit overwrites or otherwise adds data to a library that is in memory, the data added may be identified. For example, as described previously with reference to FIG. 3, when data is injected into a library, a RootKit will typically overwrite data in an export table of the library. In this example, a RootKit may overwrite data that is read by the loader for the purpose of identifying the call address of a routine that handles an API call. However, this example should be construed as exemplary and not limiting, since a RootKit may add other types of data to redirect the flow of program execution. In any event, at block 504 the integrity module 412 determines whether any data in the library loaded in memory at block 502 points to a memory address that is not in the memory image of the library. If the library contains this type of reference, it indicates that an unauthorized "hooking" of library routines will occur that is characteristic of a RootKit.

In an alternative embodiment, the integrity module 412 only performs an analysis at block 504 when certain types of "system" libraries are loaded into memory. Those skilled in the art and others will recognize that performing an analysis to determine whether a library references instructions that are outside a "memory image" requires the use of limited computer resources (e.g., CPU, memory, etc.) Moreover, in some computer systems, a limited number of system-type libraries perform all of the routines that a RootKit would need in order to conceal malware on a computer. Thus, the integrity module 412 may be configured to scan only a subset of libraries that were identified as being potentially useful to malware RootKit authors.

At decision block 506, the integrity module 412 determines whether the library loaded in memory at block 502 references instructions that are outside the library's memory image. As mentioned previously, an analysis is performed at block 504 for the purpose of determining whether a library contains a reference to instructions that are outside the library's memory image. If the analysis performed indicates that an outside reference exists, the integrity module 412 proceeds to block 507, described below. Conversely, if the analysis indicates that the library does not reference instructions that are outside the library's memory image, the integrity module 412 proceeds to block 508.

At block 507, the reference to instructions that are outside the memory image of the library loaded in memory at block 502 is "reported" as being characteristic of RootKit. As described previously with reference to FIG. 4, the integrity module 412 will typically be integrated into a software system that is designed to protect a computer from all types of malware (e.g., the software monitoring system 210). At block 507, the integrity module 412 provides an indicator to this software system using techniques that are generally known in the art that the library loaded in memory at block 502 is infected with RootKit. As a result, the software system may take remedial actions such as "cleaning" the RootKit from the computer or otherwise avoiding the functionality performed by the RootKit. Then the integrity module 412 proceeds to block 524, where it terminates.

At block 508, a protected version of the library that was loaded into memory at block 502 is read by the integrity module 412 from a storage device. One or more libraries provided by an operating system may be loaded in memory to service an application program. When program execution is scheduled to occur, the needed libraries are copied from a storage device into a memory address space available to the application program. Unfortunately, the version of the library that was loaded in memory may be modified by a RootKit for the purpose of altering the information that is communicated between the operating system and an application program. However, the version of the library that is persisted on the storage device maintains certain protections that make it difficult or impossible to modify data in this version of the library. For example, those skilled in the art and others will recognize that modern operating systems are able to limit access to a library that is stored on a storage device using known file protection mechanisms.

As illustrated in FIG. 5, at block 510 the integrity module 412 selects a routine that handles an API call in the library that was loaded in memory at block 502. Generally described, the integrity module 412 provides a way of detecting whether a library is infected with a RootKit. In one embodiment, the integrity module 412 compares properties of a suspect version of a library as reported by an operating system to actual library properties, which are identified by the integrity module 412. More specifically, routines in a library that handle API calls are sequentially selected and a determination is made regarding whether the call address where the selected routine should be located in memory is the same as the call address of the routine as reported by the computer's operating system. As mentioned previously, a RootKit will frequently gain control of the computer by redirecting the flow of program execution from a routine that handles an API call to instructions in memory that are associated with a RootKit. For example, a RootKit may overwrite a library's export table so that the flow of program execution is redirected to a cavity in a library that maintains RootKit instructions. In any event, at block 510 the module 412 selects a routine in the library loaded in memory at block 502 for the purpose of comparing the properties of the routine identified from different versions of the library.

In an alternative embodiment, the integrity module 412 only selects a subset of routines that are provided by an operating system. Those skilled in the art and others will recognize that performing an analysis to determine whether the flow of program execution is redirected away from a routine that handles an API call requires the use of limited computer resources. Moreover, some types of API calls are not helpful to RootKit authors in concealing the existence of malware on a computer. Therefore, in one embodiment, only a subset of routines that may be useful to a RootKit is selected at block 510.

As illustrated in FIG. 5, at block 512 the integrity module 412 obtains the call address of the selected routine that is calculated by the operating system from data in the library that was loaded into memory at block 502. As described previously with reference to FIG. 3, in preparation of program execution, an operating system will obtain an offset that identifies a relative location of a routine from data in a library's export table (e.g., the export table 308). Moreover, those skilled in the art and others will recognize that the operating system is responsible for using data in the library's export table to "map" routines into physical memory where each routine is assigned a call address. Thus the call address of the selected routine may be obtained, at block 512 by making a call to a computer's operating system, which is responsible for managing the allocation of memory on a computer. However, since the library that was loaded in memory at block 502 may have been modified by a RootKit, the location of the call address obtained at block 512 is not trustworthy.

At block 514, the call address of the selected routine is calculated from data in the version of the library that is stored on a storage device. As mentioned previously, data in the version of the library that is persisted on the storage device is read by the integrity module 412 at block 508. Using techniques that are generally known in the art, the integrity module 412 accesses data in this version of the library to calculate a "known good" call address for the routine. Since the data used to calculate the "known good" call address was obtained from the version of the library that is stored in a protected state on a storage device, the call address calculated at block 514 is deemed trustworthy.

At decision block 516, the integrity module 412 determines whether the call address for the selected routine obtained from the operating system at block 512 is the same as the call address calculated at block 514. If the two addresses are not the same, the flow of execution is being altered or "hooked" by a RootKit. In this instance, the integrity module 412 proceeds to block 518. Conversely, if the call addresses for the selected routine are the same, the integrity module 412 then proceeds to block 522, described below.

At block 518, the redirection in program execution that will occur is reported as being characteristic of RootKit. As described previously with reference to block 507, the integrity module 412 will typically be integrated into a software system that is designed to protect a computer from different types of malware. At block 520, the integrity module 412 provides an indicator to the software system using techniques that are generally known in the art that the library that was loaded in memory at block 502 is infected with RootKit. As a result of this notification, the software system may take remedial actions such as cleaning the RootKit from the computer or otherwise avoiding the stealth activities performed by the RootKit.

As illustrated in FIG. 5, at block 520 the integrity module 412 adds an entry to a virtual export table that may used to avoid the stealth activities performed by a RootKit. The virtual export table is a temporary data structure that stores data so that the redirection in program execution performed by a RootKit may be prevented. For example, the "known good" call address for the selected routine that was calculated by the integrity module 412 at block 514 may be used to avoid the stealth activities performed by a RootKit. At block 520, an entry is added to the virtual export table that associates a routine that handles an API call with the "known good" call address where the routine is located in memory. As a result, when an API call is made that a RootKit modifies, aspects of the generic RootKit detector perform a look-up in the virtual export table to identify the "known good" location of the routine that is supposed to handle the API call.

At decision block 522, the integrity module 412 determines whether any additional routines in the library loaded in memory at block 502 need to be analyzed for "hooking" behavior that is characteristic of RootKit. If the additional routines need to be analyzed, the integrity module 412 proceeds back to block 510 and blocks 510 through 522 repeat until all of the routines in the library have been analyzed. Conversely, if all of the necessary routines have been analyzed, the module 412 proceeds to block 524 where it terminates.

Aspects of the generic RootKit detector may be integrated into a software system that searches for all types of malware. Moreover, the software system may perform certain malware cleaning functions such as attempting to remove malware from a computer. As described in further detail below with reference to FIG. 6, one aspect of the generic RootKit detector is a handling routine 414 that is configured to avoid the redirection in program execution that is caused by a RootKit. Moreover, the handling routine 414 may be used to report a RootKit sample to a trusted entity when the identity of the RootKit is not known.

Figure 6:
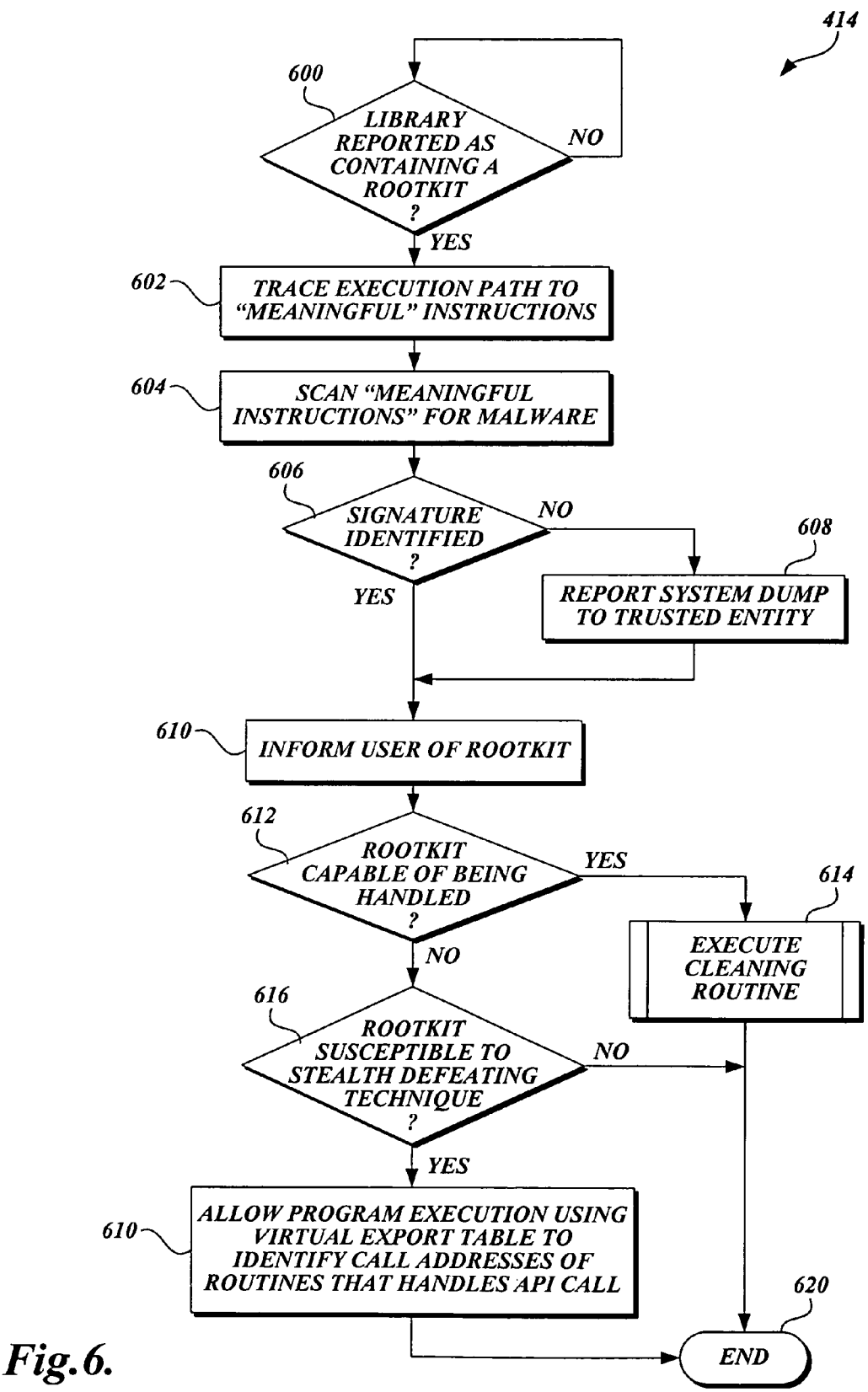
FIG. 6 is an exemplary flow diagram that depicts a handling routine which may be used to trace the redirection in program execution for the purpose of implementing RootKit defeating procedures.

Now with reference to FIG. 6, an exemplary embodiment of a handling routine 414 that performs certain stealth-defeating functions will be described. As illustrated in FIG. 6, the handling routine 414 begins at decision block 600 where a library is reported as being infected with RootKit. As mentioned previously, the handling routine 414 is designed to work in conjunction with the integrity module 412 described above with reference to FIG. 5. In this regard, the integrity module 412 performs an analysis of a library, including routines in the library that handle API calls, for the purpose of determining whether a library is infected with RootKit. When the handling routine 414 receives notice that a library is infected, the handling routine 414 begins performing actions designed to handle the infection.

At block 602, the handling routine 414 traces the redirection in program execution implemented by a RootKit to a set of "meaningful" instructions. As described above with reference to FIG. 5, a RootKit redirects the flow of program execution from a routine that is intended to handle an API call to instructions that implement logic for concealing malware on a computer. In some instances, the redirection is implemented through the use of a "jump" instruction that redirects the flow of program execution to a memory address that is outside a memory image of a library. In other instances, the flow in program execution is redirected to a memory address that is in the memory image of the library but located in a cavity in which RootKit program code has been injected. In either instance, when a library is identified as being infected, the handling routine 414 traces the flow of program execution implemented by a RootKit to a set of "meaningful" instructions, e.g., instructions that implement logic for concealing malware as opposed to instructions that merely direct the flow of program execution.

At block 604, a scan of the set of "meaningful" instructions identified at block 602 is performed using a signature-based technique. As described previously with reference to FIG. 5, a software system that implements the generic RootKit detector uses a scan engine to identify specific patterns of text that are associated with known malware. In this regard, one technique employed by some existing software systems for scanning a set of instructions for malware includes generating a "signature" from a malware sample that may be used to uniquely identify the malware. Then the scan engine compares the set of instructions that is potentially infected with malware to the signature that was generated from known malware. At block 604, the "meaningful" instructions identified at block 602 are scanned for one or more signatures generated from known malware for the purpose of identifying the specific RootKit that is infecting the computer.

At decision block 606, the handling routine 414 determines whether the scan performed at block 604 was successful in matching the set of "meaningful" instructions to a malware signature. In this example, the scan engine provides data to the handling routine 414 that indicates whether a matching signature was found and whether the identity of the RootKit on the computer is known. If a match is identified, the handling routine 414 proceeds to block 610 described below. Conversely, if a signature is not identified at block 604, the handling routine 414 proceeds to block 608.

At block 608, a system dump is reported to a trusted entity, such as an anti-malware provider. If block 608 is reached, a signature that uniquely identifies a RootKit was not identified at block 604. In this instance, the RootKit may be a previously unidentified malware that is propagating on a communication network. For the purpose of handling the new RootKit, aspects of the generic RootKit detector provide a way for an anti-malware provider to collect a sample of the RootKit. By collecting a sample of the RootKit "in the wild," an identifying signature may be generated. Thus, at block 608, the handling routine 412 causes a system dump of the computer to be generated and transmitted to a trusted entity. Those skilled in the art in others will recognize that a system dump contains all the memory contents, including any instructions that are characteristic of RootKit which is helpful to developers in handling a RootKit infection.

At block 610, a user is informed that a RootKit was identified on the computer associated with the user. In one embodiment, the user is notified that a malware was identified using an interactive system that uses graphical elements such as dialog boxes, menus, and the like, to communicate with the computer user. In this regard, the user is provided with options for handling the RootKit or otherwise avoiding the functionality implemented by the RootKit. The discussion that follows below with reference to blocks 612 through 618 describes a "default" method of handling the identification of a RootKit. However, those skilled in the art and others will recognize that in this type of interactive system a user may choose his or her own path for handling a RootKit infection.

At decision block 612, the handling routine 414 determines whether the RootKit identified by the integrity module 412 is capable of being handled in a way eliminates or restricts the functionality implemented by the RootKit. In some instances, developers are able to perform an analysis of a RootKit and develop a cleaning routine that, when executed, causes all aspects of a RootKit to be removed from a computer. In this instance, one or more active processes may be suspended, one or more files that contain RootKit instructions may be deleted, and a "rollback" of changes made to important databases such as the system registry will typically occur. In other instances, a RootKit may be "quarantined" so that program code that implements the RootKit is restricted in a way that prevents the RootKit from affecting the flow of program execution when an API call is made. In either instance, developers create a cleaning routine that either eliminates or restricts the functionality implemented by the RootKit. Generally described, a cleaning routine is typically available when the specific RootKit is susceptible to being identified. In any event, if a cleaning routine is available for the RootKit that is resident on the user's computer, the handling routine 414 proceeds to block 614. Conversely if a cleaning routine is not available, the handling routine 414 proceeds to block 616.

At block 614, the handling routine 414 causes a cleaning routine to be executed that eliminates or restricts the functionality implemented by the RootKit. As described previously, a cleaning routine may be available to handle the malicious functionality implemented by a RootKit. In this instance, the handling routine 414 causes a computer to "execute" the cleaning routine at block 614. However, since causing a computer to execute a routine is generally known in the art, further description of the actions taken at block 614 will not be described here. Then the handling routine 414 proceeds to block 620, where it terminates.

As illustrated in FIG. 6, at decision block 616 the handling routine 414 determines whether the RootKit that is resident on the user's computer is susceptible to certain stealth defeating techniques. The activities performed by a RootKit may be avoided in certain instances so that program execution may continue without being affected by a RootKit. For example, aspects of the generic RootKit detector calculate a "known good" call address for routines that are configured to satisfy API calls. As mentioned previously, the "known good" call addresses for one or more routines are maintained by aspects of the generic RootKit detector in a virtual export table. As described previously, data in the virtual export table is populated by the integrity module 412 when determining whether a computer is infected with a RootKit. In any event, at block 616, the handling routine 414 determines whether a RootKit is susceptible to this type of stealth defeating technique by performing a look up in the virtual export table. If "known good" call addresses for routines in a library used by an application program are available, the handling routine 414 proceeds to block 618. Conversely, if the "known good" call addresses are not available for all of the routines that handle API calls made by an application computer, the handling routine 414 proceeds to block 620, where it terminates.

At block 618, the handling routine 414 allows program execution to proceed using the virtual export table to identify call addresses of routines that handle API calls. The component of an operating system typically referred to as a loader will generally identify the call address for a routine that handles an API call by identifying the offset of the routine in an export table. However, when a RootKit is identified as infecting a library, aspects of the generic RootKit detector will change the typical behavior of the loader causing it to identify a routine's location in memory from data maintained in the virtual export table. As a result, the redirection of program execution implemented by the RootKit is prevented. Then the handling routine 414 proceeds to block 620, where it terminates.

It should be well understood that the embodiments of the integrity module 412 and the handling routine 414 illustrated in FIGS. 4-6 should be construed as exemplary and not limiting. For example, certain steps described with reference to FIGS. 4-6 may be performed in a different order than illustrated and described. Moreover, additional actions may be taken in certain circumstances without departing from the scope of the claimed subject matter.

Generally stated, the preferred embodiment of the invention has been illustrated and described, but it will be appreciated that various changes can be made therein without departing from the spirit and scope of the claimed subject matter.

The embodiments of the invention in which an exclusive property or privilege is claimed are defined as follows:

1. In a computer that includes a memory, a single operating system that loads a first version of a library into the memory to provide services to an application program, and a storage device that stores a second version of the library in a protected state, a method of determining whether malware is infecting the first version of the library, the method, which is implemented by the computer, comprising:
    obtaining properties of the first version of the library that was loaded into memory to provide services to the application program;
    obtaining properties of the second version of the library that is stored in a protected state on the storage device;
    comparing the properties of the first version of the library with the properties of the second version of the library, wherein the properties of the first and the second versions of the library identify particular address locations in memory that are pointed to by the first and the second versions of the library, respectively, wherein comparing the properties of the first version of the library with the properties of the second version of the library includes comparing the value of a call address obtained from a component of the single operating system using data from the first version of a library with a value of the call address calculated from an offset value obtained from the second version of the library;
    determining that the library is infected with malware when the properties of the first and second versions of the library point to different address locations in memory, or determining that the library is not infected with malware when the particular address locations pointed to by the properties of the first and second versions of the library are the same; and
    wherein the library comprises executable code describing a set of routines accessible by an application program interface to be loaded into the memory to provide services to the application program upon an application program interface call;
    wherein the method further includes using a virtual export table to associate routines in the library with call addresses that identify the respective memory locations of the routines and using an integrity modules to calculate a call address of a routine from data in the second version of the library and to store a value of the call address in the virtual export table.

2. The method as recited in claim 1, wherein the malware is a RootKit that is configured to conceal malicious instructions that are resident on the computer.

3. The method as recited in claim 1, further comprising if the first version of the library is infected with malware:
   (a) tracing the flow of program execution to a set of instructions that implement the malware; and
   (b) scanning the set of instructions that implement the malware for a signature that uniquely identifies the malware.

4. The method as recited in claim 3, wherein if a malware is identified, causing a cleaning routine to be executed that removes the malware from the computer.

5. The method as recited in claim 1, wherein the library is a dynamically linked library that is linked to a calling application program at runtime.

6. The method as recited in claim 1, wherein obtaining the properties of the first version of the library includes determining whether the first version of the library references an instruction outside of the memory image allocated to the first version of the library by the operating system; and
   wherein if the first version of the library references an instruction outside of the memory image allocated to the first version of the library, determining that the library is infected with malware.

7. The method as recited in claim 1, wherein obtaining the properties of the first version of the library that was loaded into memory to provide services to the application program includes obtaining a call address of a routine in the first version of the library from a component of the single operating system.

8. The method as recited in claim 7, wherein obtaining the properties of the second version of the library that is stored in a protected state on the storage device includes:
   (a) obtaining the offset value from the second version of the library that identifies the respective location of the routine in the library; and
   (b) calculating the call address using the offset value obtained from the second version of the library for the routine that identifies the memory location where the routine may be accessed.

9. The method as recited in claim 3, further comprising informing a user that malware is infecting the first library.

10. The method as recited in claim 9, further comprising providing the user with options for handling the malware within a graphical user interface comprising graphical elements including dialog boxes and menus, the options including at least a default option.

11. A computer-readable storage medium storing computer-executable instructions which, when executed in a computer that includes a single operating system configured to copy a library into a memory address space available to an application program, carries out a method for determining whether a routine in the library that satisfies an Application Program Interface call is infected with malware, the method comprising:
   obtaining properties of the first version of the library that was loaded into memory to provide services to the application program;
   obtaining properties of the second version of the library that is stored in a protected state on the storage device;
   comparing the properties of the first version of the library with the properties of the second version of the library, wherein the properties of the first and the second versions of the library identify particular address locations in memory that are pointed to by the first and the second versions of the library, respectively, wherein comparing the properties of the first version of the library with the properties of the second version of the library includes comparing the value of a call address obtained from a component of the single operating system using data from the first version of a library with a value of the call address calculated from an offset value obtained from the second version of the library;
   determining that the library is infected with malware when the properties of the first and second versions of the library point to different address locations in memory, or determining that the library is not infected with malware when the particular address locations pointed to by the properties of the first and second versions of the library are the same; and
   wherein the library comprises executable code describing a set of routines accessible by an application program interface to be loaded into the memory to provide services to the application program upon an application program interface call;
   wherein the method further includes using a virtual export table to associate routines in the library with call addresses that identify the respective memory locations of the routines and using an integrity modules to calculate a call address of a routine from data in the second version of the library and to store a value of the call address in the virtual export table.

12. The computer-readable storage medium as recited in claim 11, further comprising if the first version of the library is infected with malware:
   (a) tracing the flow of program execution to a set of instructions that implement the malware; and
   (b) scanning the set of instructions that implement the malware for a signature.

13. The computer-readable storage medium as recited in claim 12, further comprising if a signature is identified:
   (a) recording the value of the call address for the routine that was calculated using the offset value obtained from the second version of the library in a data store; and
   (b) using the recorded call address to locate the routine in memory when an Application Program Interface call is made that is handled by the routine.

14. The computer-readable storage medium as recited in claim 11, wherein the method further includes calculating a call address for a routine by using an offset value obtained from the second version of the library and which includes determining whether the call address references a location that is outside the memory image of the library; and
   wherein if the call address references a location outside of the memory image allocated to the first version of the library, determining that the library is infected with malware.

15. The computer-readable storage medium as recited in claim 12, further comprising if the first library is infected with malware, informing a user.

16. A software system, the software system being performed in a computing environment comprising a processor, a memory, and a storage device, for determining whether a computer is infected with a RootKit, the software system comprising:
   a processor; and
   memory storing computer-executable instructions which, when executed by the processor, implement a method comprising:
      obtaining properties of the first version of the library that was loaded into memory to provide services to the application program;

obtaining properties of the second version of the library that is stored in a protected state on the storage device;

comparing the properties of the first version of the library with the properties of the second version of the library, wherein the properties of the first and the second versions of the library identify particular address locations in memory that are pointed to by the first and the second versions of the library, respectively;

determining that the library is infected with malware when the properties of the first and second versions of the library point to different address locations in memory, or determining that the library is not infected with malware when the particular address locations pointed to by the properties of the first and second versions of the library are the same; and wherein the library comprises executable code describing a set of routines accessible by an application program interface to be loaded into the memory to provide services to the application program upon an application program interface call, wherein the system further comprises:

a virtual export table operative to associates a routine in the library with a call address that identifies the memory location of the routine; and an integrity module that is configured to calculate a call address of a routine from data in the second version of the library and to store a value of the call address in the virtual export table.

17. The software system as recited in claim 16, wherein the operating system is further configured to identify the location of the routine in memory from data stored in the virtual export table.

18. The software system as recited in claim 16, wherein the integrity module is implemented in a component of an operating system that operates in kernel mode.

19. The software system as recited in claim 16, wherein the integrity module is implemented in an application program that operates in user mode.

20. The software system as recited in claim 16, further comprising a user interaction system that provides notification to the user if it is determined the computer is infected with a RootKit.

21. The software system as recited in claim 20, wherein the user interaction system provides graphical elements including dialog boxes and menus to communicate with the computer regarding options for handling of the RootKit, the handling of the RootKit including at least a default option.

* * * * *